May 13, 1969
W. G. CIBULA ET AL
3,444,378
X-RAY TIMING DEVICE USING A LIGHT-CONDUCTING PADDLE WITH
SPACED LIGHT-ADMITTING HOLES FOR UNINTERRUPTED
LIGHT TRANSMISSION TO A DETECTOR
Filed May 13, 1965
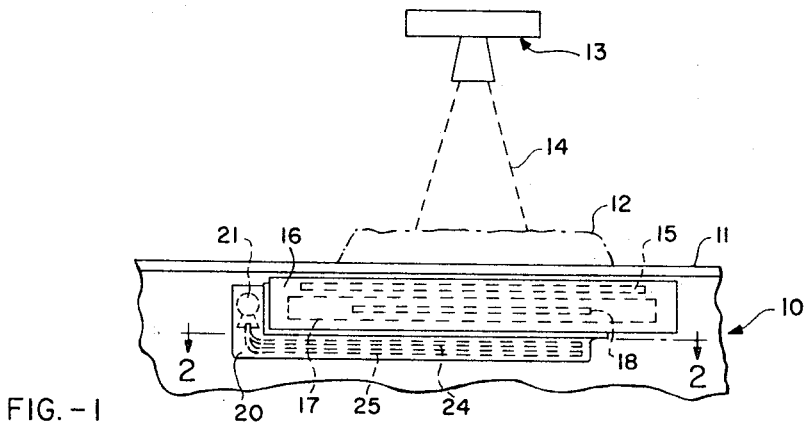
FIG.-1
FIG.-2
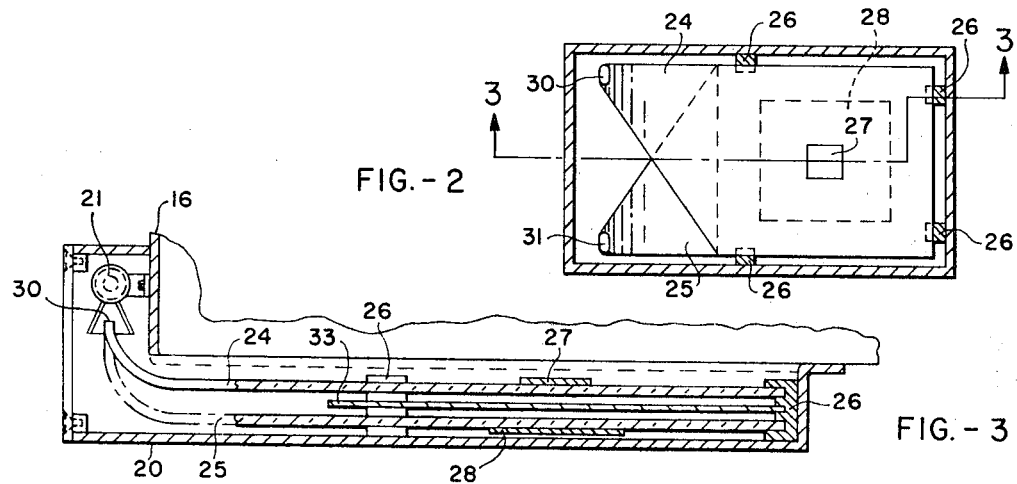
FIG.-3
FIG.-4
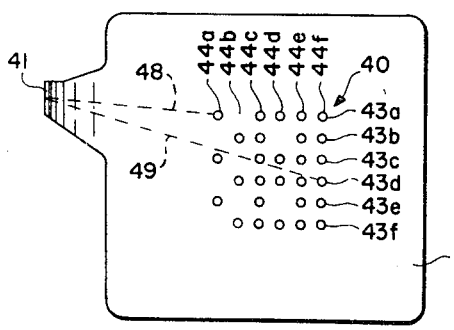
FIG.-5
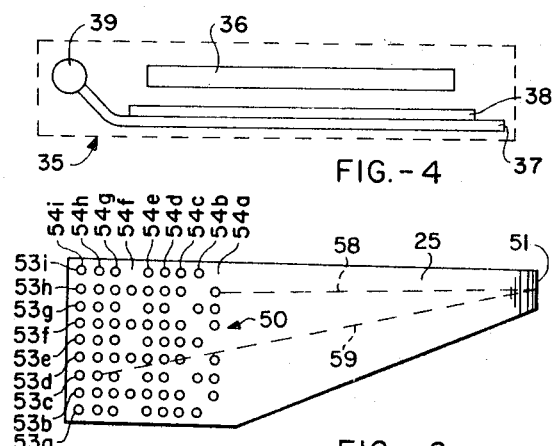
FIG.-6
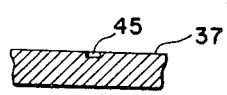
FIG.-7
*INVENTOR.*
WILLIAM G. CIBULA
RONALD SCHUSTER
BY
*Watts & Fisher*
ATTORNEYS United States Patent Office 3,444,378
Patented May 13, 1969

3,444,378
X-RAY TIMING DEVICE USING A LIGHT-CONDUCTING PADDLE WITH SPACED LIGHT-ADMITTING HOLES FOR UNINTERRUPTED LIGHT TRANSMISSION TO A DETECTOR
William G. Cibula, Chesterland, and Ronald Schuster, Mentor, Ohio, assignors, by mesne assignments, to Picker Corporation, White Plains, N.Y., a corporation of New York
Filed May 13, 1965, Ser. No. 455,480
Int. Cl. H05g 1/28
U.S. Cl. 250—95   16 Claims

ABSTRACT OF THE DISCLOSURE

X-ray phototimer using a light-conducting paddle having a light-admitting portion. The light-admitting portion has a series of spaced, bottomed holes, the perimeter of each being defined by a closed curve. The spaced holes are preferably arranged in rows with certain of the rows transverse to, and certain of the rows generally parallel to, the paths of light transmission from the holes to a spaced phototube used as a pickup for a phototiming circuit.

---

This invention pertains to X-ray apparatus and more particularly to an X-ray apparatus utilizing a phototiming device to control the length of exposure.

The use of phototiming devices to control the length of an X-ray exposure is now well known. An early one of such devices is described in United States Patent 2,441,324, granted May 11, 1948, to Morgan and Hodges.

In United States Patent No. 2,993,123, issued to Jack Ball on July 18, 1961, there is a disclosure of a structure in which a small fluorescent sheet is positioned in the path of an X-ray beam. The light generated in this sheet is transmitted into a light conducting sheet which serves as a "light pipe." The sheet is a polymethyl methacrylate resin such as that sold commercially under the trademark Lucite by E. I. du Pont. The light-conducting sheet transmits light to a photomultiplier tube. This tube in turn is connected to an exposure control circuit such as the circuit described in greater detail in the above-referenced patent to Jack Ball.

The present invention is directed to the light-conducting sheets, known as "paddles," which are used in these phototiming devices. The invention provides improved light transmission from the fluorescent sheet to the paddle.

Phototiming devices are used principally with two kinds of exposures. One of these types is when an X-ray tube is positioned above an X-ray table and a film carried below the table by a bucky cassette is exposed. The other type of exposure is with an X-ray tube below the table and the X-ray film carried by a spot film device such as the device shown in United States Patent 2,668,913, issued Feb. 9, 1954, to E. R. Goldfield et al.

When phototiming devices are utilized with a bucky mechanism, the light transmitting paddles are positioned below the X-ray film cassette so that the cassette is between the X-ray tube and the paddles. The cassette causes some diffusion and absorption of the X-radiation. This diffusion and absorption coupled with the relatively wide range of film sizes which may be used in a bucky result in the use of two superimposed paddles, one of which is used for relatively small sized X-ray exposures and the other for relatively large size exposures.

In the case of a spot filmer, the paddle is positioned between the X-ray tube and the film. Here because the problems of diffusion and absorption by the cassette are eliminated, a single paddle is used. The spot filmer phototimer is usually equipped with a fluorescent sheet which is larger in area than the largest size film which can be accommodated by the spot filmer so that the filtering effect of the fluorescent sheet is uniform throughout the entire area of the film. The pickup area in the paddle is of an area smaller than the smallest exposure which will be taken by the spot filmer so that uniform results are obtained irrespective of the size of the film being exposed.

With both types of phototiming devices, the fluorescent sheet is maintained in intimate contact with the paddle. The present invention is directed to improvements in the light transmission from the fluorescent sheet into the paddle in a manner which improves the over all performance of the device and greatly improves the dependability of it.

In the past, one proposal for permitting light from the fluorescent sheet to be transmitted into the paddle was to provide serrations in the surface of the paddle as described in United States Patent 2,901,632, issued Aug. 25, 1959, to Stava et al. Another proposal which has been utilized has been to roughen a portion of the surface of the paddle as by sand blasting. The serrations or sand blasting each remove a portion of the reflective surface of the paddle permitting light to be transmitted from the fluorescent sheet into the paddle.

It has now been determined that these prior systems for removing the reflective surface have also contributed materially to poor and, in fact, erratic performance of phototiming devices. It is believed that this poor performance has been due to some of the light transmitted into the paddle then being transmitted back out through the roughened surface. Thus, if a light impulse from the fluorescent sheet passes through the roughened surface, it is reflected by the opposite surface of the paddle. The reflected beam of light then will pass, in many instances, through the roughened surface and back out of the paddle.

It is believed that another contributing factor to the inconsistent results which have been obtained in the past is that the percentage of light transmitted to the light responsive element from portions of the roughened area nearest the light responsive element has been higher than that transmitted from portions remote from the light responsive element. Light received from any given point of entry will be disseminated over a hemisphere-like volume. The further that given point is from the light responsive element, the smaller the segment of a hemisphere which will stimulate the light responsive element. Accordingly, if an X-ray is taken of an object which passes high amount of radiation in the area of a roughened surface nearest the responsive element, a substantially higher amount of light energy will be transmitted to the phototube than if the bright area is along the edge of a roughened surface remote from the phototube.

If one takes, with prior art devices, an X-ray radiograph which produces high light energy at the edge of a roughened surface near the phototube and low light energy at the opposite edge of the surface, the signal transmitted to the phototube will be strong. If a radiograph of identical total energy but reversed in that the high energy is remote from the phototube and the low energy portion of the radiograph near it, the signal received by the phototube will be weak and the exposure too long. With this invention, unlike the prior art devices, the distribution of a given quantum of light energy will not materially effect the accuracy of an exposure controlled by phototiming devices.

It has been discovered that a carefully arranged small pattern of holes in the surface of the paddle adjacent the fluorescent sheet produces outstanding results. The holes are very carefully arranged so that a line drawn from each hole to a pickup tube will preferably not lie in a plane normal to the reflective surfaces of the paddle and intersecting another hole. Thus, light is reflected back and forth within the paddle without, in its path to the pickup tube, passing another hole where it has an opportunity to be transmitted out of the paddle. In practice, it has been found that it is not possible to position all holes in this manner but substantially all holes are so positioned and the holes are spaced such that if the light is transmitted in a plane which intersects another hole, the smallness of the holes reduces to the very minimum the possibility of the light being transmitted out of the paddle.

In the preferred arrangements, the holes are arranged in rows within a square. The rows furthest from the phototube have more holes than do the rows closer to the tube. This accommodates for losses in light energy as it is transmitted to the tube. It also overcomes the problem that the segment of light received from each hole decreases in proportion to the distance from the phototube. Thus, the total light energy received by the phototube is received in approximately equal portions from each part of a given size of the square. Thus, if one has six rows, as an example, the tube will receive approximately equal total amounts of light energy from the two rows closest to the tube, the two rows furthest, and the central two rows.

Other objects and a fuller understanding of the invention may be had by referring to the following description and claims taken in conjunction with the accompanying drawings in which:

In the drawings:

FIGURE 1 is a fragmentary somewhat schematic view of a portion of an X-ray table, an overhead supported X-ray tube and a bucky tray and phototimer of this invention;

FIGURE 2 is a sectional view of the device of FIGURE 1 as seen from the plane indicated by the line 2—2;

FIGURE 3 is a sectional view, on an enlarged scale, with respect to FIGURES 1 and 2, of the device of FIGURES 1 and 2 as seen from the planes indicated by the lines 3—3 of FIGURE 2;

FIGURE 4 is a schematic view of the device of this invention in a spot filmer;

FIGURE 5 is a top plan view on a reduced scale of a typical paddle of this invention as employed in a spot filmer;

FIGURE 6 is a top plan view on a reduced scale of the lower paddle of FIGURE 3; and, FIGURE 7 is an enlarged fragmentary sectional view showing one of the holes of the paddle of either of FIGURES 5 and 6.

Referring to the drawings and to FIGURE 1 in particular, a fragmentary portion of an X-ray table is shown at 10. The table 10 includes a top 11 which supports an object under study 12. An X-ray tube 13 is positioned above the table and adapted to emit a beam of X-rays in a cone designated by the dotted lines 14.

The X-ray table will be equipped with the usual reciprocating bucky grid 15. The bucky grid 15 is mounted in a bucky tray 16. A film holder such as a cassette 17 carries a sheet of X-ray film 18 positioned in the path of the beam 14.

A phototimer housing 20 is secured to the bottom and one side of the bucky tray 16. The phototimer housing 20 houses a suitable light responsive control element such as a phototube at 21. The phototube 21 receives light transmitted to it by a selected one of upper and lower light transmitting paddles 24, 25. The paddles 24, 25 each have polished external surfaces which are adapted to guide light in confined paths. These paddles are, as noted above, preferably made of a material sold under the trademark Lucite or an equivalent commercially available material.

Referring to FIGURES 2 and 3, the paddles 24, 25 are maintained in suitable position within the housing 20 by supporting blocks 26. Upper and lower light emitting fluorescent sheets 27, 28 are positioned adjacent the upper and lower paddles 24, 25, respectively. The fluorescent sheets 27, 28 are respectively positioned adjacent light accepting portions of the paddles 24, 25. Light accepted by the paddles in these portions is transmitted to light emitting portions 30, 31 adjacent the phototube 21. The paddles thus serve as guide members which are highly transparent to light and transmit a maximum of light energy from these admitting to the emitting portions.

The upper fluorescent screen 27 is a small screen for relatively small exposures. Typically, for example, the upper screen 27 may be two inches square to provide a light emitting means which is operatively adjacent the light accepting portion of the paddle 24. Because of this small size, it has been found reasonably dependable to use known means of providing the light admitting portion such as roughening.

The lower fluorescent screen 28 is of a larger size than the screen 27 and adapted to serve as a light emitting means operatively adjacent the light admitting portion of the lower paddle 25. A mirror 33 is preferably between the two paddles so that light emitted by the fluorescent screen 27 when the lower paddle 25 is being used, will not provide additional light in the lower paddle.

Unlike prior proposals for phototiming, however, no member for blocking the flow of X-rays is provided beneath the upper fluorescent member 27. Thus, with prior proposals a small lead screen has typically been positioned beneath the upper paddle 27 so that the center of the lower fluorescent screen 28 was blacked out. The lower fluorescent screen, then, would provide a hollow rather than a solid square of light. It has been found, however, that the filtering effect of the upper fluorescent screen 27 is less upsetting to the obtainment of dependable, consistent phototiming results than is the effect produced by such a lead screen.

In FIGURE 4, a spot film device is shown schematically at 35. The spot film device 35 includes a film cassette 36, a phototiming paddle 37, and a fluorescent screen 38. In the case of the spot filmer, the phototiming paddle 37 and the fluorescent screen 38 are positioned between the source of X-rays and a film carried by the cassette 36. Accordingly, the fluorescent screen 38 is of a size larger than the largest film which will be exposed in the spot filmer so that while some X-ray energy is lost, in converting to light in the fluorescent screen, the filtering effect of the fluorescent screen will be uniform over the entire film. A phototube is provided at 39 for receiving light transmitted by the single paddle 37 of the spot filmer.

The features of this invention are shown best in FIGURES 5, 6, and 7. FIGURE 5 is a top plan view of the paddle 37 of FIGURE 4. This paddle is, other than for its length, substantially identical to the paddle 25. It includes a light admitting portion 40 and a light emitting portion 41 which is normally positioned adjacent the phototube 39. The paddle 25 has a light admitting portion 50 and an emitting portion 51 adjacent the phototube 21.

In the case of the spot filmer paddle 37 shown in FIGURE 5, the dimensions of the square admitting portion 40 will be four inches by four inches in a typical paddle. The lower paddle 25 of the bucky phototimer embodiment also has a four by four admitting portion.

The light admitting portion of the paddles 25, 37 of this invention are defined by a plurality of bottomed holes arranged in longitudinal and transverse rows. As disclosed, each such hole is a drilled hole and thus is a hole having a perimeter defined by a closed curve in the plane of a surface of the paddle. Thus, in FIGURE 5 there are six longitudinal rows 43a–f and six transverse rows 44a–f. In FIGURE 6, there are nine longitudinal rows 53a–i and nine transverse rows 54a–i. These rows 43, 44 and 53, 54 together respectively define the light admitting portions 40, 51 which are each generally square in over all configuration. The paddles 24 and 37 other than these holes and the emitting portions 41, 51 are highly polished so that light is admitted only through the holes and thereafter confined between the two highly polished and reflective surfaces.

A typical one of the holes is shown at 45 in FIGURE 7. The hole 45 is bottomed and made for example $\frac{1}{64}$ to $\frac{1}{32}$ inch deep in a paddle of $\frac{1}{4}$ inch thickness. The holes may typically be $\frac{3}{32}$ inches in diameter and are formed only adjacent to the fluorescent screen so that they optically provide uniform admission of light energy. As indicated by the dash lines 48–49, and 58–59, the holes are arranged such that a line drawn from the center of a hole to the center of a light emitting portions 41, 51 respectively in substantially all cases does not intersect another hole. In the case of FIGURE 5 all such lines are spaced from one another. In the case of FIGURE 6 substantially all such lines are spaced. Thus, each line 48, 49 and 58, 59 defines the center of a path of light transmission from a hole to its light emitting portion 41 or 51 with the top and bottom of the path defined by highly polished surfaces. Once the light is admitted through any given hole in FIGURE 5, at least along the center of its path of travel to the light emitting portion 41, it is confined between two highly reflected surfaces and has no opportunity to pass out of the light transmitting paddle. This is substantially true in FIGURE 6 as well.

It has been found this objective of providing paths of light which do not intersect other holes can be obtained with holes arranged in straight rows. Certain of the transverse rows will have holes arranged with uniform spacing, rows 44c, e, and f in the embodiment of FIGURE 5 and rows 54d, e, g, h, and i in the embodiment of FIGURE 6. While the holes in the longitudinal rows 43d and f are uniformly spaced, there are fewer holes and no longitudinal row is a complete row in the sense of filling out the square defined by the overall hole pattern. None of the longitudinal rows in the FIGURE 6 construction has uniformly spaced holes.

Expressed another way, the transverse rows may be considered to form close, center, and furthest groups. Thus, the rows 44a, 44b form a close group nearest the light emitting portion 41, the rows 44c and d form a center group, and the rows 44e and f form a furthest group from the light emitting portion 41. Similarly, 54a–c, 54d–f and 54g–i, respectively, form close center and furthest groups. Since the furthest group must provide more light sources due to smaller segments of the total light from each hole in the furthest group being received by the phototube and due to some losses through holes of the other groups, the rows 44e and f and 54g–i are all complete rows. The center groups each have a lesser total number of holes than does the furthest group. The center group of FIGURE 5 includes the one complete row 44c, while the center group of FIGURE 6 has two complete rows, 54d and e. The close group is composed of two partial rows 44a and b in FIGURE 5 and three partial rows 54a–c in FIGURE 6. An examination of FIGURE 5 will show that the furthest group has twice as many holes as does the close group composed of the rows 44a and b. In FIGURE 6 the furthest group has fifty percent more holes than the close group.

With the described arrangements when either of the light-emitting screens 28, 38 is stimulated uniformly over its entire area, the total light energy transmitted to the phototube by each group of the associated light admitting portion will be substantially equal to each other group.

Although the invention has been described in its preferred form with a certain degree of particularity, it is understood that the present disclosure of the preferred form has been made only by way of example and that numerous changes in the details of construction and the combination and arrangement of parts may be resorted to without department from the spirit and the scope of the invention as hereinafter claimed.

What is claimed is:

1. A device for guiding light energy in a confined path from a source of light to a light-responsive element comprising:
   (a) a guide member made of material having a high degree of transparency to light;
   (b) said guide member having a light-accepting portion and a light-emitting portion displaced therefrom and including selected external surfaces adapted for guiding light in confined paths from the accepting portion to the emitting portion;
   (c) at least one of said external surfaces of said accepting portion having a plurality of holes each having a perimeter defined by a closed curve substantially in the plane of said one external surface, said holes being at spaced locations for admitting light energy;
   (d) said one surface other than said holes being reflective to transmit a maximum of light energy from the entire accepting portion to the emitting portion; and,
   (e) each of a majority of said holes being so positioned that there is an imaginary line along which light can travel from each hole of the majority to said emitting portion without intersecting another hole.

2. A device for guiding light energy in a confined path from a source of light to a light-responsive element comprising:
   (a) a guide member made of material having a high degree of transparency to light;
   (b) said guide member having a light-accepting portion and a light-emitting portion displaced therefrom and including selected external surfaces adapted for guiding light in confined paths from the accepting portion to the emitting portion;
   (c) at least one of said external surfaces of said accepting portion having a plurality of bottomed holes each having a perimeter defined by a closed curve substantially in the plane of said one external surface, said holes being at spaced locations for admitting light energy;
   (d) said one surface other than said holes being reflective to transmit a maximum of light energy from the entire accepting portion to the emitting portion; and,
   (e) each of said paths of light is from a different hole to said emitting portion and wherein the centers of the majority of said paths are spaced such that the paths do not intersect other holes.

3. The device of claim 2 wherein all of said path centers are spaced.

4. In an X-ray apparatus having a directed beam of X-rays and a light-response control element displaced from the path of the beam:
   (a) light-emitting means in the path of the beam for intercepting and converting the X-rays into a proportional amount of light energy;
   (b) a guide member made of light-transparent material and forming a light-transmitting path between said light-emitting means and said control element;
   (c) said guide member having a light-accepting portion comprised of a plurality of spaced bottomed holes each having a perimeter defined by a closed curve substantially in the plane of said one external surface, said holes being for optically providing a substantially uniform admission of flight energy;
   (d) said guide member providing transmission of a maximum of light energy from said light-accepting portion to the control element;
   (e) said guide member including a light-emitting portion; and,
   (f) each of a majority of said holes being so positioned that there is an imaginary line along which light can travel from each hole of the majority to said emitting portion without intersecting another hole.

5. The apparatus of claim 4 wherein the accepting portion of the guiding member includes external surfaces displaced from each other in the direction of the beam, and wherein both of said surfaces are polished other than said holes and the light-emitting means is positioned adjacent the holes.

6. The apparatus of claim 4 wherein the accepting portion of the guiding member includes external surfaces displaced from each other in the direction of the beam, and wherein the light emitting means comprises a fluorescent screen positioned adjacent one external surface and a mirror positioned adjacent the other external surface.

7. In an X-ray apparatus having a directed beam of X-rays and a light-responsive control element displaced from the beam;
   (a) a fluorescent screen in the path of the beam for converting the X-rays to light;
   (b) a solid light guiding member having a light-accepting portion in the path of the beam and adjacent the screen and a light-emitting portion adjacent the light-responsive control element;
   (c) said guide member having means for guiding the accepted light in a confined path from the accepting portion to the emitting portion to energize the light-responsive control element;
   (d) said accepting portion having a surface configuration composed of a series of spaced bottomed holes each having a perimeter defined by a closed curve with each such closed curve substantially in a plane, said holes forming optical means for accepting light therein to provide a substantially uniform transfer of light intensity from the screen to the control element; and,
   (e) each of a majority of said holes being so positioned that there is an imaginary line along which light can travel from each hole of the majority of said emitting portion without intersecting another hole.

8. In an X-ray apparatus having an X-ray tube for an X-ray beam, the improvement comprising:
   (a) a light-transmitting sheet positioned in the path of said beam and having spaced, polished, light-reflective surfaces;
   (b) said sheet having spaced light-accepting and emitting portions;
   (c) light-responsive means positioned near the emitting portion;
   (d) X-ray responsive light-emitting means positioned near said accepting portion;
   (e) said accepting portion comprising spaced bottomed holes each having a perimeter defined by a closed curve substantially in the plane of said one external surface, said holes being arranged in rows in one of said surfaces; and,
   (f) each of a majority of said holes being so positioned that there is an imaginary line along which light can travel from each hole of the majority to said emitting portion without intersecting another hole.

9. The device of claim 8 where there are two such sheets superimposed and a reflective means is between the accepting portion of the two sheets.

10. The device of claim 9 wherein said reflective means is X-ray pervious.

11. The device of claim 8 wherein the holes are in groups with each group providing substantially the same light energy to the responsive means as each other group.

12. The device of claim 8 wherein the holes are arranged in groups and wherein the group nearest the responsive means has fewer holes than all other groups.

13. The device of claim 12 wherein the group furthest from said responsive means has more holes than the other groups.

14. The device of claim 8 wherein the holes are arranged in rows some of which are generally parallel to and some of which are generally transverse to a path of light transmission from one portion to the other.

15. The device of claim 14 wherein the holes in certain of the transverse rows are uniformly spaced from one another.

16. The device of claim 15 wherein there are less holes in each of the longitudinal rows than in said certain rows.

References Cited

UNITED STATES PATENTS

| 2,695,964 | 11/1954 | Schepker | 250—227 X |
| 2,901,632 | 8/1959 | Stava et al. | 250—95 |
| 2,993,123 | 7/1961 | Ball | 250—95 |
| 3,207,899 | 9/1965 | Leishman | 250—65 X |

WILLIAM F. LINDQUIST, *Primary Examiner.*

U.S. Cl. X.R.

250—65, 227; 350—96